US011943617B2

(12) United States Patent
Sarda et al.

(10) Patent No.: US 11,943,617 B2
(45) Date of Patent: *Mar. 26, 2024

(54) METHOD FOR ACQUIRING ACCESS RIGHTS TO CONDITIONAL ACCESS CONTENT

(71) Applicant: NAGRAVISION SarL, Cheseaux-sur-Lausanne (CH)

(72) Inventors: Pierre Sarda, Echallens (CH); Philippe Stransky, Cheseaux-sur-Lausanne (CH); Bertrand Wendling, Divonne-les-Bains (FR)

(73) Assignee: NAGRAVISION SarL, Cheseaux-sur-Lausanne (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/157,166

(22) Filed: Jan. 20, 2023

(65) Prior Publication Data
US 2023/0224707 A1 Jul. 13, 2023

Related U.S. Application Data

(63) Continuation of application No. 17/138,062, filed on Dec. 30, 2020, now Pat. No. 11,589,232, which is a
(Continued)

(51) Int. Cl.
H04W 12/08 (2021.01)
G06F 9/54 (2006.01)
(Continued)

(52) U.S. Cl.
CPC ............. H04W 12/08 (2013.01); G06F 9/54 (2013.01); G06Q 20/3278 (2013.01);
(Continued)

(58) Field of Classification Search
CPC .............. G06Q 20/385; G06Q 20/425; G06Q 20/3278; G06Q 30/0637; H04N 21/47815;
(Continued)

(56) References Cited

U.S. PATENT DOCUMENTS 7,239,704 B1   7/2007 Maillard et al.
8,036,598 B1 * 10/2011 Zhu ................. H04L 51/222
                                                709/224
(Continued)

FOREIGN PATENT DOCUMENTS

WO    WO 2005/078615    8/2005

OTHER PUBLICATIONS

European Search Report issued in European Application No. 14158752 dated Mar. 2, 2015.

Primary Examiner — Cheikh T Ndiaye
(74) Attorney, Agent, or Firm — Oblon, McClelland, Maier & Neustadt, L.L.P.

(57) ABSTRACT

A method of acquiring access rights to conditional access content. The method comprises receiving an access right on a first terminal through a first communication channel; storing said access right in said first terminal; sending a request for said conditional access content to a content provider, said request containing at least an identifier of an account to which said first terminal is associated, an identifier of the requested content and a piece of information concerning said access right; verifying, by said content provider, the authenticity of said access right using said piece of information concerning the access right; and when there has been a successful verification, marking said access right as used, and sending said conditional access content to at least one terminal linked to said account. The first terminal
(Continued)

using near field communication technology (NFC) during at least one transfer of said access rights.

12 Claims, 3 Drawing Sheets

Related U.S. Application Data continuation of application No. 16/527,940, filed on Jul. 31, 2019, now Pat. No. 10,911,955, which is a continuation of application No. 14/202,818, filed on Mar. 10, 2014, now Pat. No. 10,411,786.

(60) Provisional application No. 61/775,737, filed on Mar. 11, 2013.

(51) Int. Cl.
| | | |
|---|---|---|
| *G06Q 20/32* | (2012.01) | |
| *G06Q 20/38* | (2012.01) | |
| *G06Q 20/42* | (2012.01) | |
| *G06Q 30/0601* | (2023.01) | |
| *H04B 5/00* | (2006.01) | |
| *H04B 7/15* | (2006.01) | |
| *H04L 9/40* | (2022.01) | |
| *H04L 41/50* | (2022.01) | |
| *H04L 47/70* | (2022.01) | |
| *H04N 21/254* | (2011.01) | |
| *H04N 21/2543* | (2011.01) | |
| *H04N 21/414* | (2011.01) | |
| *H04N 21/422* | (2011.01) | |
| *H04N 21/4363* | (2011.01) | |
| *H04N 21/4367* | (2011.01) | |
| *H04N 21/4627* | (2011.01) | |
| *H04N 21/478* | (2011.01) | |
| *H04N 21/6334* | (2011.01) | |
| *H04N 21/8355* | (2011.01) | |
| *H04W 4/80* | (2018.01) | |
| *H04W 76/10* | (2018.01) | |

(52) U.S. Cl.
CPC ......... *G06Q 20/385* (2013.01); *G06Q 20/425* (2013.01); *G06Q 30/0637* (2013.01); *H04B 5/0031* (2013.01); *H04B 7/15* (2013.01); *H04L 41/50* (2013.01); *H04L 47/70* (2013.01); *H04L 63/0492* (2013.01); *H04L 63/10* (2013.01); *H04N 21/2541* (2013.01); *H04N 21/2543* (2013.01); *H04N 21/41407* (2013.01); *H04N 21/4222* (2013.01); *H04N 21/42221* (2013.01); *H04N 21/43637* (2013.01); *H04N 21/4367* (2013.01); *H04N 21/4627* (2013.01); *H04N 21/47815* (2013.01); *H04N 21/6334* (2013.01); *H04N 21/8355* (2013.01); *H04W 4/80* (2018.02); *H04W 76/10* (2018.02)

(58) Field of Classification Search
CPC ......... H04N 21/6334; H04N 21/41407; H04N 21/43637; H04N 21/4627; H04N 21/4367; H04N 21/42221; H04N 21/4222; H04N 21/2541; H04N 21/8355; H04N 21/2543; H04B 5/0031; H04B 7/15; H04L 41/50; H04L 47/70; H04L 63/0492; H04L 63/10; G06F 9/54; H04W 12/08; H04W 4/80; H04W 76/10
See application file for complete search history.

(56) References Cited

U.S. PATENT DOCUMENTS

| | | | |
|---|---|---|---|
| 2007/0192255 A1 | 8/2007 | Ohmori et al. | |
| 2008/0132167 A1* | 6/2008 | Bent | ...................... H04L 69/18 |
| | | | 455/41.2 |
| 2008/0212779 A1* | 9/2008 | Persoon | ............. G06Q 20/0655 |
| | | | 701/58 |
| 2009/0006624 A1* | 1/2009 | Alkove | .................. G06Q 30/02 |
| | | | 709/226 |
| 2009/0282102 A1* | 11/2009 | Geurts | ................... G06F 21/10 |
| | | | 709/204 |
| 2012/0220282 A1 | 8/2012 | Kwon et al. | |
| 2013/0005250 A1* | 1/2013 | Kim | ...................... G08C 23/04 |
| | | | 455/41.1 |
| 2013/0054697 A1* | 2/2013 | Cha | .................... H04N 21/8586 |
| | | | 709/204 |
| 2013/0185137 A1* | 7/2013 | Shafi | ..................... G06Q 30/02 |
| | | | 705/14.35 |
| 2014/0325676 A1* | 10/2014 | Beauvais | ................ G06F 21/10 |
| | | | 726/27 |

* cited by examiner

METHOD FOR ACQUIRING ACCESS RIGHTS TO CONDITIONAL ACCESS CONTENT

CROSS-REFERENCE TO RELATED APPLICATIONS

This application is a continuation of U.S. application Ser. No. 17/138,062, filed Dec. 30, 2020, which is a continuation of U.S. application Ser. No. 16/527,940, filed Jul. 31, 2019, now U.S. Pat. No. 10,911,955 issued Feb. 2, 2021, which is a continuation of U.S. application Ser. No. 14/202,818, filed Mar. 10, 2014, no U.S. Pat. No. 10,411,786 issued Sep. 10, 2019, which claims the benefit of U.S. Provisional Application No. 61/775,737, filed Mar. 11, 2013. The entire contents of all of which are incorporated herein by reference.

TECHNICAL FIELD

Embodiments disclosed herein relate to a method for acquiring access rights to conditional access content.

More specifically, disclosed embodiments relate to the acquisition of a right received by a user's first terminal and the transfer of said right such that it can be used on a user's second terminal, the first terminal using Near Field Communication (NFC) technology during at least one operation for the transfer of the right.

BACKGROUND ART

Near Field Communication Technology, known by the acronym "NFC", is a wireless, high frequency communication technology, having a range of a few centimeters, for the exchange of information between multiple devices. This technology is derived from a combination of a smart card interface and a contactless reader in a single device.

An NFC device is able to communicate with other NFC devices as well as devices operating in accordance with ISO 14443 (contactless smart cards) standard.

NFC standards cover the NFC communication protocols and data exchange formats and are based on existing standards for radio frequency identification (RFID) such as ISO/IEC 14443, FeliCa and ISO/IEC 18092. They include standards defined by the "NFC Forum", which was founded in 2004 by Nokia, Philips and Sony and includes more than 180 members.

NFC is an extension of RFID technology, allowing two-way communication between two devices, while previous systems, such as contactless smart cards, allowed only one-way communication.

NFC technology is usable only over a short distance of about a few centimeters, which implies a voluntary use and prevents unintentional use.

NFC devices can be active or passive. A passive NFC device, such as a tag, smart card or a simple chip affixed to an object contains information only readable by other NFC-enabled devices. A passive NFC device is powered by the electromagnetic field generated by a reader (active device) and therefore does not need its own power supply.

An active NFC device, however, is a device that generates an electromagnetic field. This generation can be done to communicate with a passive device (described above) or to establish a communication channel between two active devices.

The fact that a device like a smartphone has a power supply does not necessarily mean that it will work in active mode only. That is, a smartphone can handle the NFC interface in active or passive modes. In passive mode, the device emulates a chip card. In this mode, the smartphone (or any other portable device such as tablets) will store, in a secure memory, information that is normally stored in a card. Thus, when the smartphone detects an electromagnetic field, it can access the secure memory and a corresponding device having NFC capacities will be able to read information in passive mode from the secure memory.

The following are examples of known applications that use NFC technology:
 payment using a credit card or contactless mobile device (e.g., mobile phone, smartphone, laptop, tablet computer . . . ) on a contactless payment terminal;
 payment for a parking space on a terminal accepting contactless payment using an NFC mobile terminal;
 contactless purchase of a ticket and contactless validation of a ticket displayed on a mobile phone;
 management of coupons, loyalty points, etc. in a store, at retailers, etc. (e.g., couponing);
 accessing and starting a vehicle using a mobile phone;
 reading product information (e.g., price, composition, allergy, etc.) in a store;
 controlling physical access to premises (e.g., meeting room, business, classroom, etc.);
 exchanging profiles between users of a social network or of a game by bringing phones close together (e.g., user peer-to-peer communications);
 reading an electronic business card with a PDA (Personal Digital Assistant);
 synchronizing Internet bookmarks and contacts between a PDA and a mobile phone;
 recovering key to a WiFi access point approaching an NFC device from an authorized terminal;
 accessing automation features of a building.

SUMMARY

Among the different possible applications of NFC technology, some of them concern the storage and the transfer of rights. In the embodiment disclosed herein, NFC technology is used in connection with a first terminal that receives rights, to store and to transfer rights in a second terminal and to use the rights in a remote place.

Objects of the disclosed embodiments are achieved by a method of acquiring access rights to conditional access content. The method comprises:
 receiving an access right on a first terminal through a first communication channel;
 storing said access right in said first terminal;
 sending a request for said conditional access content to a content provider, said request containing at least an identifier of an account to which said first terminal is associated, an identifier of the requested content and a piece of information concerning said access right;
 verifying, by said content provider, the authenticity of said access right using said piece of information concerning the access right; and
 when there has been a successful verification, marking said access right as used, and sending said conditional access content to at least one terminal linked to said account;
 said first terminal using a near field communication technology (NFC) during at least one operation for the transfer of said access rights.

The embodiments disclosed herein are useful when a user has at least two terminals, one of these terminals being mobile and having near field communication (NFC) capabilities. The second terminal is a terminal on which the content can be used. Such a terminal can be e.g., a TV set, tablet, computer, mobile phone (smartphone), PDA or a digital radio. According to the embodiments disclosed herein, the user can have several terminals using the content, said terminal being linked to a user's account.

The embodiments disclosed herein use NFC technology during at least one right transfer operation, i.e., either during the acquisition of the right, during the transfer of the right from an access right provider or a shop to a user's first terminal, during the transfer of the right from a user's first terminal to a second terminal, or during both transfer operations.

The use of NFC technology at least at the level of the first terminal forces at least one communication of this terminal to be local, which ensures greater security than remote communications would provide.

BRIEF DESCRIPTION OF THE DRAWINGS

The embodiments disclosed herein and their advantages will be better understood with reference to the enclosed drawings and the following detailed description, in which.

DETAILED DESCRIPTION

The method disclosed herein is typically used in the field of home networks. Such networks can comprise several terminals such as e.g., TV sets, mobile phones, smartphones, tablets or computers. In such a network, the different devices or terminals often have some of the same rights and some different rights. Thus, it is possible that e.g., a user is authorized to view a movie on his/her tablet as often as he/she wishes during a three day period, but only once, at any time, on his/her TV set. In such a context, it is important that the rights for an authorized user are managed in an efficient and correct way and that a non-authorized user cannot benefit illegally from these rights.

In the framework for describing the embodiments of the invention, a user has at least one first terminal that is in charge of acquiring an access right and a second terminal that is used to access to the content.

Figure 1:
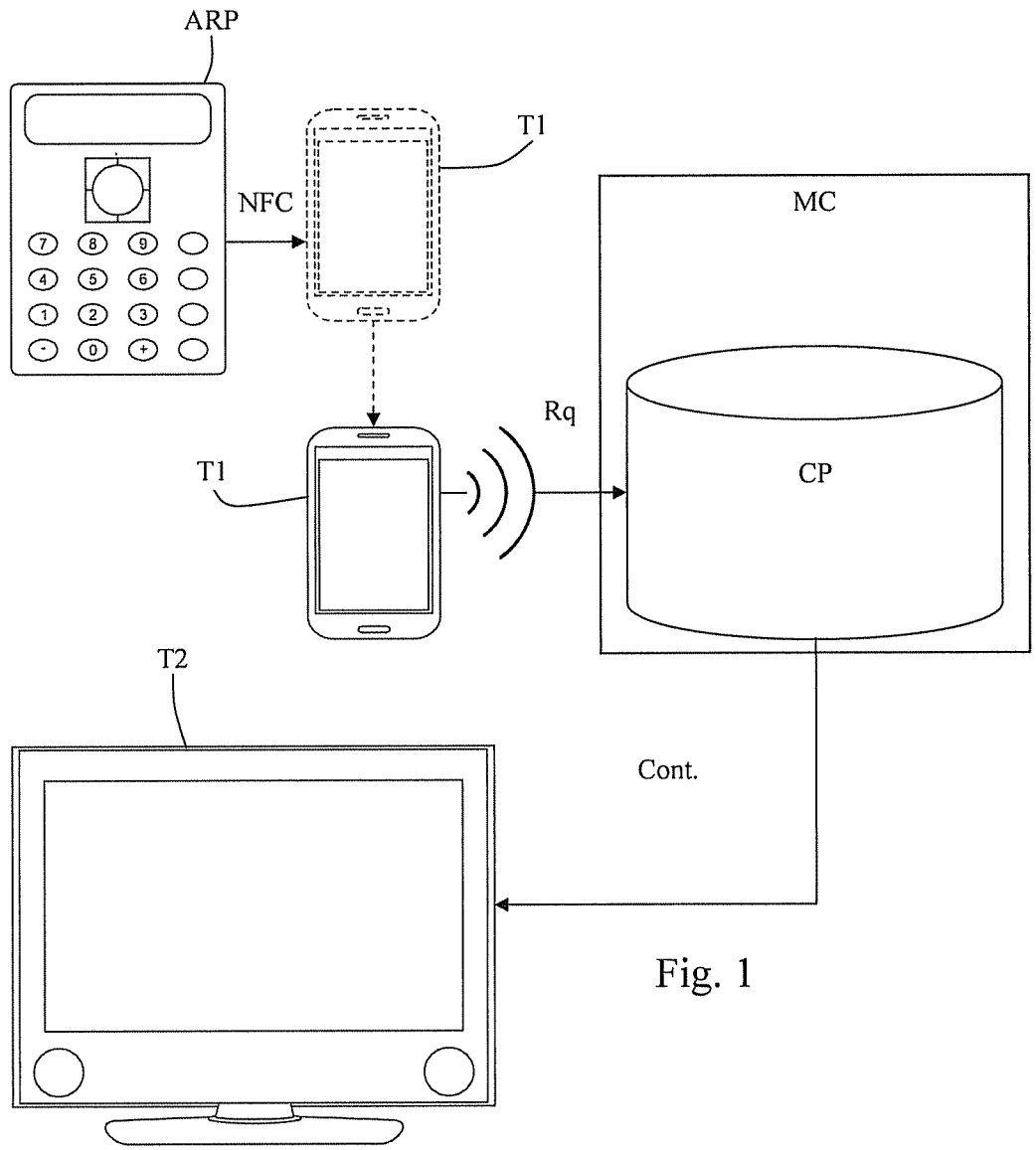
FIG. 1 illustrates a system used for the implementation of a first embodiment disclosed herein.

With reference to the system illustrated in FIG. 1, the method disclosed herein uses a first device or a first terminal T1 comprising both a remote communication mechanism and a local communication mechanism. Such a terminal T1 can be e.g., a mobile phone or a tablet among others. The local communication mechanism uses NFC technology and enables a local communication at short distance, typically in the range of a few centimeters. The remote communication mechanism can be a conventional mechanism using for example the GSM network.

The method disclosed herein also uses a second terminal T2 on which the content is used, as will be explained below in more detail.

The method further requires the presence of an access right provider ARP and a content provider CP.

Figure 2:
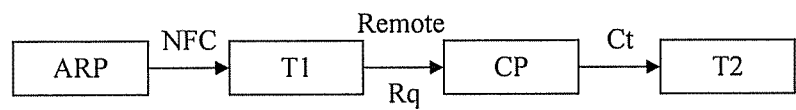
FIG. 2 is a block diagram illustrating a method of the first embodiment.

FIG. 2 illustrates a first embodiment of the method disclosed herein using the elements illustrated in FIG. 1. In a first step, a user goes to an access right provider ARP with the first terminal T1. This access right provider ARP can typically be a shop, cinema, theater, etc. having a terminal using NFC technology. The user can receive an access right e.g., as a commercial offer, after having purchased goods for a given amount, after having attended a show or a movie, or after having used a given service. In order to acquire said right, the user places its first terminal T1 close to a terminal of the access right provider ARP. The right for said user is then transmitted from the provider's terminal to the user's first terminal T1, using NFC technology. The concerned right is then stored in a memory of the first terminal T1.

According to a first embodiment, the implementation of the method requires the prior registration of the user at a management center MC. This registration enables the management center to acquire data used for sending management messages to the concerned user. This registration further enables sharing keys with the registered receiver devices. These keys can be common to several terminals of a single user or they can be individual and different for each terminal. These keys can be the same for the management center MC and the receiver or, conversely, they can be different, the key in the management center MC and the key at the user's side being both keys of a private-public key pair.

The registration of the user's terminals at the management center MC enables a targeted transmission of the management messages containing the rights to the concerned receiver device. These rights are usually encrypted by a key enabling the receiver to decrypt the messages received. When a user is registered, an account is normally created; this account groups all of the terminals of the user's home network. Thus, the management center MC is able to manage all of the user's terminals and associate their usage rights, which can vary individually for each terminal.

According to an alternative embodiment, the user's terminals are not registered in advance. When a right is received by the first terminal T1, a request Rq is sent to the management center MC. This request contains all of the elements that are required for sending the content to a given terminal of the concerned user.

In the embodiment illustrated in FIGS. 1 and 2, when the right is stored in the user's first terminal T1, a request Rq is sent to the management center MC by this first terminal T1. If a prior registration of the user has been made, the request can contain a right and a mechanism for verifying its authenticity. The content provider CP has the mechanism for determining which account the user who sent the right is associated with. It is thus not necessary that this information be in the request. It could, however, be introduced in the request to enable a verification process if desired.

If, on the other hand, no previous registration has been made, the request Rq must contain information concerning the user's terminal to which the content provider CP must send the content to.

At this stage, the content provider CP has the information concerning the concerned user (independent from the fact that a previous registration was requested or not). In particular, the content provider has, for each user, an account enabling it to identify the different terminals associated with that user.

As mentioned previously, the request contains, among others, the right and a mechanism for verifying its authenticity. The request can further contain a mechanism for identifying the author of the right, possibly validity conditions such as a date, and possibly information related to the user's terminal on which the content will be used.

In this embodiment, the request Rq is sent by a remote communication channel. According to a desired embodiment, the first terminal T1 is a mobile phone such as a smartphone and the rights are transmitted to the content provider CP by GSM.

When the management center MC receives the request containing the right, the center determines the origin of the request and associates this request to the account of the user. The determination of the user's account also enables determining keys associated with the account, which enables verifying the authenticity of the right received. Several well known methods exist for verifying the authenticity of the rights. One method, which can for example be used in the present embodiment, comprises integrating with the right, a verification code that can be e.g., the result of a one way function using a key, said function being applied to the right. When the request is received, the management center MC can apply the same one way function with the same key, to determine if the right contained in the request is authentic.

When this verification step has successfully been performed, the management center MC determines which content Ct corresponds to the right said provider received. In the illustrated example, the management center MC also contains content that can be sent to the users. Therefore, the management center also plays the role of content provider CP.

According to the first embodiment, each right corresponds to specific content. According to a specific example, the access right provider ARP can be a movie theater. The right can enable accessing, for a reduced price, a movie from the same distributor which distributed the movie the user has viewed in this theater. According to another example, the user obtains the right to download the music of the movie he/she viewed.

The disclosed embodiment can be used for e.g., in any commercial shop for various purposes (e.g., discount coupons, gifts, . . . )

According to a second embodiment disclosed herein, a right does not have a one-to-one correspondence to specific content (e.g., an event, a service or a discount). In this embodiment, it is necessary to acquire several rights before being authorized to access to the content. As an example, it may be necessary to receive five rights from a movie theater to obtain the possibility of downloading one movie for free. In this case, the rights can be collected and stored in the user's first terminal T1 and sent when all of the collected rights enable the access to a good or service. The rights can also be collected and stored by the content provider CP or the management center MC, for example, and linked with the user's account. In this case, each right is sent to the content provider. The content provider suggests a product when the stored rights enable access to this product.

According to an alternative embodiment, the products proposed vary depending on the number and/or the value of the rights accumulated. In other words, the goods do not "cost" the same number of rights. For example, a content provider can propose the downloading of the music of a movie for a "value" of one right, the viewing of an already seen movie for three rights, the viewing without storage for four rights and the viewing of the same movie with storage for six rights. The user will thus be able to choose different goods depending on the number of rights accumulated. The number of rights deducted from the user's account depends on the goods chosen by said user.

When the user has chosen the content he wishes to access, after the appropriate verifications such as e.g., a verification concerning the authenticity of the right and the verification of the suitability between the right requested for the concerned content and the rights available for this user, the content Ct can be transmitted to the user. This transmission is made on one of the user devices, referred to as second terminal T2. The transmission is accompanied with conditions of use. In particular, the conditions of use indicate which operations can be made with the content sent to the second terminal T2. These operations are, for example, viewing only, without the right to store the content, or alternatively, the right to store the content. These operations can also concern the quality of the images (resolution), or temporal constraints such as e.g., viewing during one week. The operations can also be linked to a number of viewings (single or multiple viewings).

When the rights are valid, and when the provider has determined which terminal the content must be sent to, the provider sends the content to the concerned terminal together with the conditions of use. This terminal thus uses the content according to the associated conditions of use.

Figure 3:
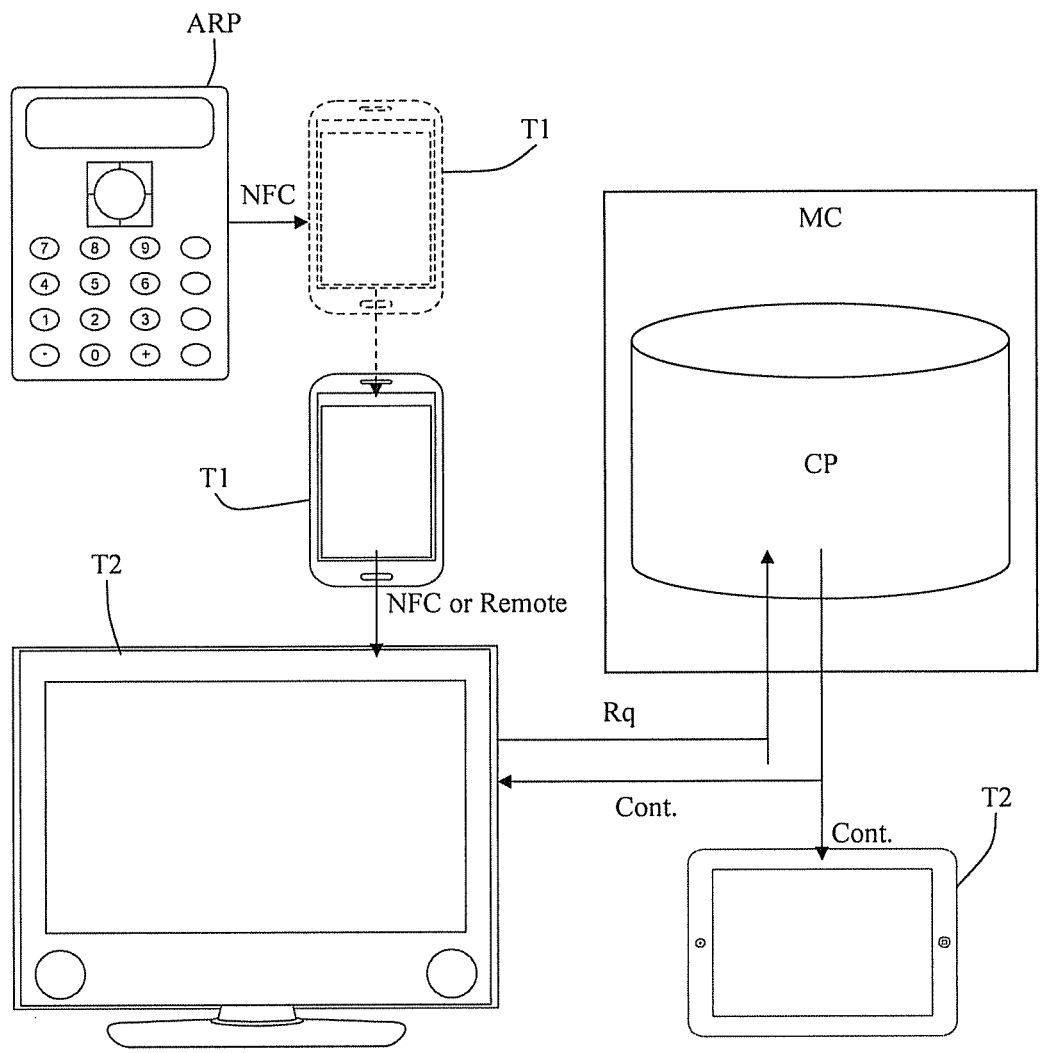
FIG. 3 illustrates a system used for the implementation of a second embodiment disclosed herein.
Figure 4:
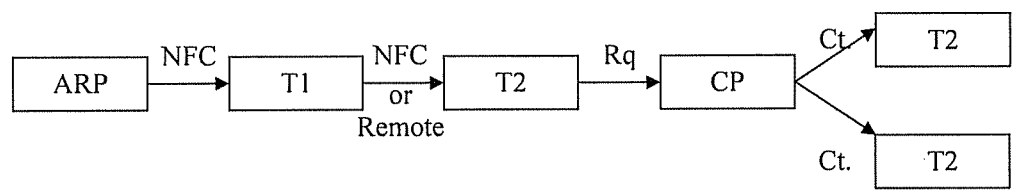
FIG. 4 is a block diagram illustrating a method of the second embodiment.

In the embodiment illustrated in FIGS. 3 and 4, the user's first terminal T1 receives the rights through NFC in a way that is similar to what has been described above with reference to the embodiment illustrated in FIGS. 1 and 2. The rights are also stored in the first terminal T1. In the present illustrated embodiment, the rights are then transmitted from the user's first terminal T1 to the second terminal T2, which, in the example illustrated, is a multimedia unit. This transmission can be made by a short distance communication channel (e.g., through NFC) if the second terminal has a communication mechanism for this technology. Other communication mechanisms can also be used, such as for example Wifi or Bluetooth.

When the second terminal T2 has received the rights, the terminal prepares a response similar to the request sent by the first terminal in the embodiment illustrated in FIGS. 1 and 2. This request Rq is sent to the content provider CP, or the management center MC, which processes this request, proceeds with the requested verifications and authentications. The content provider then determines which terminals associated with the user's account the content must be sent to. This determination can be e.g., made from the content of the request. The content provider further adds the conditions of use and transmits the content and the conditions of use to the concerned terminal.

In the embodiment illustrated in FIGS. 3 and 4, the concerned terminal can be the multimedia unit that sent the request, another multimedia unit, a tablet or any similar terminal.

It should be noted that the conditions of use could be different in different terminals. For example, the embodiment can limit the use of the content to a single viewing on the multimedia unit and/or limit the use of the same content on the tablet to an unlimited number of viewings in one week.

Figure 5:
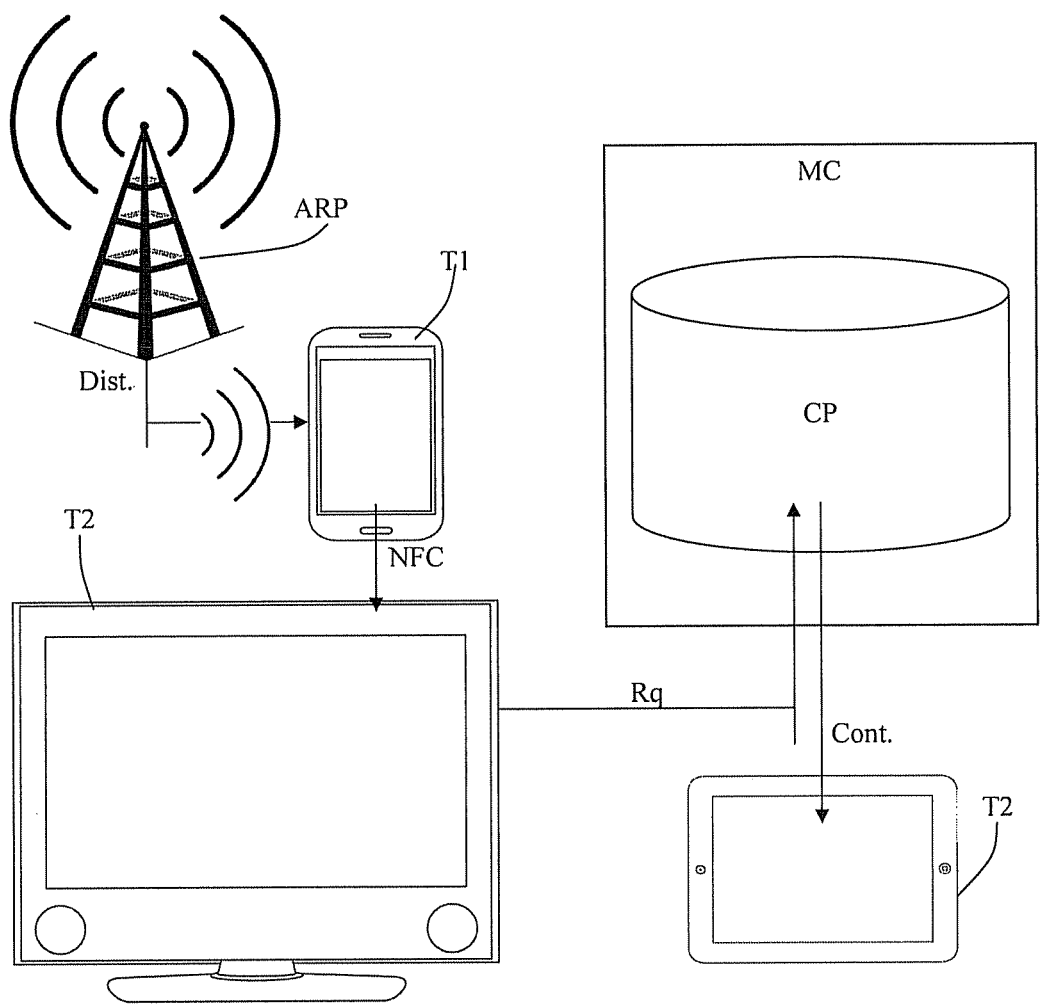
FIG. 5 illustrates a system for the implementation of a third embodiment disclosed herein.
Figure 6:
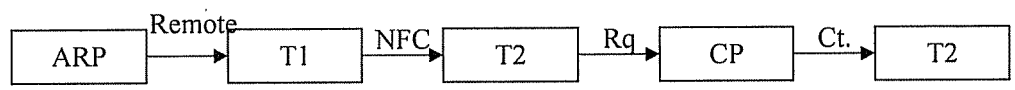
FIG. 6 is a block diagram illustrating a method of the third embodiment.

In the embodiment of FIGS. 5 and 6, the first terminal T1 comprises a remote communication mechanism as well as a local communication mechanism. Such a terminal can be a mobile phone (smartphone) or a tablet. The local communication mechanism uses NFC technology and enables a local communication at a very short distance, typically in the range of a few centimeters. The remote communication mechanism can be a conventional communication mechanism using e.g., the GSM network.

In the method illustrated in FIG. 5, the access right provider ARP sends rights to a user, more specifically to the user's first terminal, through a remote communication mechanism. This transmission can typically use the GSM network. These rights can be sent encrypted or unencrypted as they are addressed individually to each concerned user.

When the message containing the rights is received by the first terminal T1, the rights are extracted from the message before being stored in the first terminal. According to the desired security level, the right can be encrypted or, on the contrary, stored in unencrypted form.

The encryption key used for the storage of the rights is advantageously a key that is common to all of the devices belonging to the user (for example, a key associated with the user's account). Thus, when a right is transmitted from the first terminal to a user's second terminal, this right can be read by all of the user's terminals.

In the following steps of the disclosed method, the rights are transmitted from the first terminal T1 to a second terminal T2 using local communications, and more specifically, a near field communication (NFC) mechanism. In order to transfer a right by using this communication mechanism, the receiver device must be placed at a short distance from a reader integrated with the user device.

The rights received by a second terminal must be validated prior to being usable. In order to perform this validation, a request is transmitted to the content provider or management center, similar to the method discussed above with respect to the embodiment of FIGS. 3 and 4. The content provider determines which terminal the content must be sent to and what are the conditions of use associated with the content and/or the terminal. The content is then sent to the concerned terminal in a conventional way. The method disclosed herein forces a near field communication, which forces a proximity between the user's terminals and consequently, a voluntary step made by the user, which lowers the risks of fraud.

According to a desired embodiment, once a right is used (i.e., transferred from a reception device to a device in which it is used), said right is deleted from the reception device or marked as non usable. This prevents the same right from being used several times, for example, on several different devices.

According to another embodiment, the right can be used several times. This could be done e.g., for a limited number of times, for an unlimited number of times, or during a limited time period. The choice of the implementation is free and can be determined e.g., by the right's provider.

The invention claimed is:

1. A method of determining conditional access content, comprising:
   receiving at least a first access right and at least a second access right on a terminal, the terminal including a first communication mechanism for receiving the access rights and a second communication mechanism;
   sending, to a content provider by the terminal using the second communication mechanism, the first access right and the second access right with at least an identifier of an account to which said terminal is associated;
   determining, by the content provider receiving the first or the second access right, the conditional access content;
   verifying the terminal using said account, the terminal being linked to said account; and
   upon successful verification of said first access right, said second access right, and the terminal, receiving said conditional access content by the terminal.

2. The method according to claim 1, wherein the conditional access content is linked to conditions for use.

3. The method according to claim 2, wherein the conditions for use depend on at least a type of said terminal.

4. The method according to claim 1, wherein the first and second access rights are accumulated in order to gain access to conditional content.

5. The method according to claim 1, wherein said first communication mechanism includes a near field communication (NFC) mechanism.

6. The method according to claim 1, wherein at least one of the first access right and the second access right is included in a commercial offer.

7. A terminal that determines conditional access content, comprising:
   circuitry configured to
   receive at least a first access right and a second access right via a first communication mechanism;
   send, via a second communication mechanism, said first access right and said second access right to a content provider with at least an identifier of an account to which the terminal is associated;
   determine, by the content provider receiving the first or the second access right, the conditional access content;
   verify the terminal using said account, the terminal being linked to said account; and
   upon successful verification of said first access right, said second access right, and the terminal, receive said conditional access content.

8. The terminal according to claim 7, wherein the conditional access content is linked to conditions for use.

9. The terminal according to claim 8, wherein the conditions for use depend on at least at type of the terminal.

10. The terminal according to claim 7, wherein the first and second access rights are accumulated in order to gain access to the conditional access content.

11. The terminal according to claim 7, wherein the first communication mechanism includes a near field communication (NFC) mechanism.

12. The terminal according to claim 7, wherein at least one of the first access right and the second access right is included in a commercial offer.

* * * * *